United States Patent

Bouche

[15] 3,675,471
[45] July 11, 1972

[54] METHOD OF MEASURING VIBRATION CHARACTERISTICS OF STRUCTURES

[72] Inventor: Raymond R. Bouche, 4902 Indianola Way, La Canada, Calif. 91011

[22] Filed: May 26, 1969

[21] Appl. No.: 827,556

Related U.S. Application Data

[63] Continuation-in-part of Ser. No. 629,532, April 10, 1967, Pat. No. 3,446,907.

[52] U.S. Cl. .................................................. 73/67
[51] Int. Cl. ........................................... G01n 29/00
[58] Field of Search ............ 73/67, 67.2, 71, 71.1, 67.1

[56] References Cited

UNITED STATES PATENTS

| | | | |
|---|---|---|---|
| 3,372,575 | 3/1968 | Schloss | 73/67.1 |
| 3,030,803 | 4/1962 | Painter | 73/67.1 |
| 3,121,327 | 2/1964 | Arnold | 73/67.2 |
| 3,307,393 | 3/1967 | Kessler | 73/67.1 |

OTHER PUBLICATIONS

Bradley, " Mechanical Impedance Testing," Technical Paper by Endevco Corp., Jan. 1964.
Shock and Vibration Handbook, Section 6, F. E. Reed, " Dynamic Vibration Absorbers and Auxiliary Mass Dampers," pp. 6– 6 to 6– 11 1961.

*Primary Examiner*—Richard C. Queisser
*Assistant Examiner*—Arthur E. Korkosz
*Attorney*—Reed C. Lawlor

[57] ABSTRACT

A testing device having a static mass equal to or less than the static mass of the structure to be tested in the local region of attachment, acting as a rigid mass at all frequencies, and having a measuring device portion which has a dynamic mass less than about ten times the least value of dynamic mass of the structure, is rigidly mounted on a test structure. The testing device is then vibrated and the resulting force which is applied to the test structure, the resulting acceleration of the test structure, and the phase angle between the force and acceleration are measured. The frequency of vibration is then varied and the above stated measurements are repeated. The testing device is then attached to a second point on the structure and the foregoing steps are repeated.

13 Claims, 10 Drawing Figures

INVENTOR
RAYMOND R. BOUCHE

INVENTOR
RAYMOND R. BOUCHE 3,675,471

METHOD OF MEASURING VIBRATION CHARACTERISTICS OF STRUCTURES

This application is a continuation-in-part of my co-pending application Ser. No. 629,532, now Pat. No. 3,446,907, filed Apr. 10, 1967.

CROSS REFERENCES TO RELATED APPLICATIONS

U.S. Pat. No. 3,210,993  Issued: Oct. 12, 1965
U.S. Pat. No. 3,222,919  Issued: Dec. 14, 1965
U.S. Pat. Ser. No. 629,532, filed Apr. 10, 1967

This invention relates in general to measuring vibration characteristics of structures and, in particular, to an improved method for measuring vibration characteristics of suspended electrical transmission cables and the like. These measurements are made in the laboratory to simulate vibrations excited by the wind in overhead lines.

In a typical suspended cable, Aeolian vibrations are established in the line as a result of the wind flowing past the line. The vibration is caused by vortices which are formed on the leeward side of the line. These vortices alternate in direction, setting up alternating vertical forces, which in turn cause the cable to vibrate, largely in a vertical plane.

The frequency at which the direction of these vortices alternates is proportional to the wind velocity and inversely proportional to the diameter of the cable. As the wind speed increases, the frequency of alternation of the vortices increases and also the frequency of the resultant vibrations increase.

When the frequency of alternation of the vertical forces applied to the line is the same as a resonant frequency of that particular span of cable, the cable will resonate. A particular span of cable will have a large number of resonant frequencies. The resonant frequencies of a particular cable span depend upon the tension in the cable, the weight per unit length of the cable, and span length. It also depends upon the gravitational constant. The vibration pattern of the line takes the form of a sinusoidal deflection curve with the vibration originating at a clamped end of the span and traveling along the length of the span and back again. Nodes are established at the ends of the span and both loops and nodes between the ends.

As the cable vibrates it flexes at the points at which it is clamped. Such repeated flexing leads to fatigue failure in the cable which may be substantially reduced by the proper design and application of dampers.

Methods previously employed for measuring the vibration characteristics of structures in the laboratory, such as cables strung in a test span often produce inaccurate results due to certain deficiencies in the testing methods. Such inaccuracies may result from a failure to obtain sufficient information concerning the vibration characteristics of the structure or from employing a type of testing device which will yield inaccurate results, or both. The testing method of my invention overcomes these defects by providing sufficient information for a complete determination of the vibration characteristics of test structures when a certain type of testing device is employed.

SUMMARY

The method of this invention for determining the vibration characteristics of a structure comprises the steps of attaching a testing device to the structure to be tested, energizing the testing device to vibrate the structure at a predetermined frequency; measuring the vibration characteristics of the structure; and attaching the testing device at a second point on the structure and repeating the foregoing steps. The testing device is a rigid body which has the characteristic that the phase angle of the force applied to the testing device relative to the resulting acceleration of the testing device is about zero as viewed from the point of attachment to the structure at all frequencies of interest.

The foregoing and other advantages, features, and characteristics of this invention are described below in connection with the following drawings wherein.

Figure 1A:
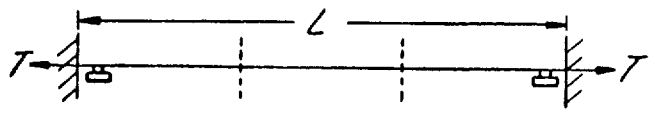
FIGS. 1a, 1b, 1c are schematic representations used in describing this invention.
Figure 1B:
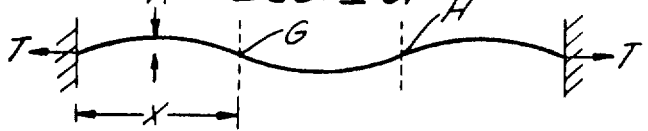
Figure 1C:

Consider first a stretched cable under a constant tension load "T" pounds as illustrated in FIG. 1a. The natural characteristic of this cable is to vibrate up and down in a plane with an amplitude having any one of a number of specific wave shapes, such as that shown in FIG. 1b. The shape of such a deflection curve is nearly sinusoidal. The cable vibrates up and down at a particular frequency between extreme positions indicated by FIGS. 1b and 1c the deflection curve attains the configuration illustrated in FIG. 1c exactly one-half cycle after it attains the configuration shown in FIG. 1b. The deflection amplitude "A" depends primarily on the wind speed and the tension load on the cable and is exactly the same for each half-cycle when a steady state condition is reached. At certain points "G" and "H" along the cable, the deflection of the cable is zero and the distance between these points is half the wavelength of the vibration. These points "G" and "H" are called node points and are points at which the cable is motionless. The distance between node points is referred to as the loop length. As shown in FIG. 1b the maximum amplitude of deflection occurs halfway between node points or near the center of each loop length.

A very useful concept in the design of vibration dampers and cables is that of mechanical impedance or dynamic mass. Dynamic mass of a cable span is defined as the force applied to the cable at any point in a vertical direction divided by the acceleration of the cable at the same point in the vertical direction. The dynamic mass varies along the length of the cable and at each point it is a function of frequency. It is obvious that as the dynamic mass increases, the force required to produce a given acceleration increases. Likewise the less the acceleration for a given force, the greater is the dynamic mass. Since the maximum amplitude of deflection occurs at points half-way along the loop length, and acceleration is largest at points of maximum deflection amplitude, these are points at which the dynamic mass or mechanical impedance of the cable is a minimum. Conversely, at points on the line near the node points, the acceleration is small and hence the dynamic mass of the line at that point is relatively large.

Figure 2:
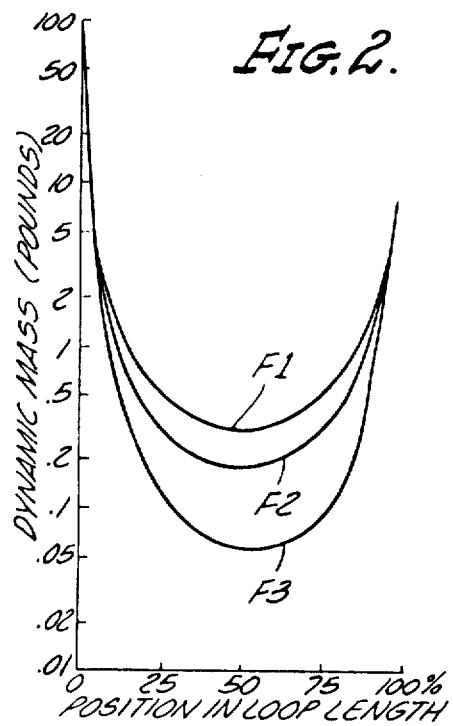
FIGS. 2, 3 and 4 are graphs which demonstrate certain characteristics of a line or cable.

FIG. 2 represents how the dynamic mass of a given cable span, in pounds, varies as a function of the position in the loop length, expressed in percent of loop length. In this graph the dynamic mass is calculated for a 1.108 inches diameter Drake transmission line for various resonant frequencies of the line. In the higher modes of vibration, the resonant frequency increases and the loop length correspondingly decreases. Regardless of the loop length, however, the dynamic mass of the line is much smaller near the center of the loop than at positions near the node points. The three curves F1, F2, and F3 correspond to different frequencies.

Not only does the dynamic mass of the line vary between node points, but the dynamic mass of the line at a given point on the line varies with the frequency at which the line vibrates. A fixed point on the line may be in the middle of a loop at one frequency, and near a node point at a different frequency. For example, if a given span of cable vibrates at such a frequency as to create a nine foot loop length, the dynamic mass at a point 4.5 feet from a clamped end of the span will be relatively small. However, as the frequency of vibration increases, the loop length becomes shorter and when the line vibrates at such a frequency as to establish a 4.8 foot loop length, the point which is 4.5 feet from the clamped end of the cable is much closer to the node point at 4.8 feet from the clamped end and the dynamic mass of the line at that point for the higher frequency is substantially larger than the dynamic mass at the lower frequency.

Figure 3:
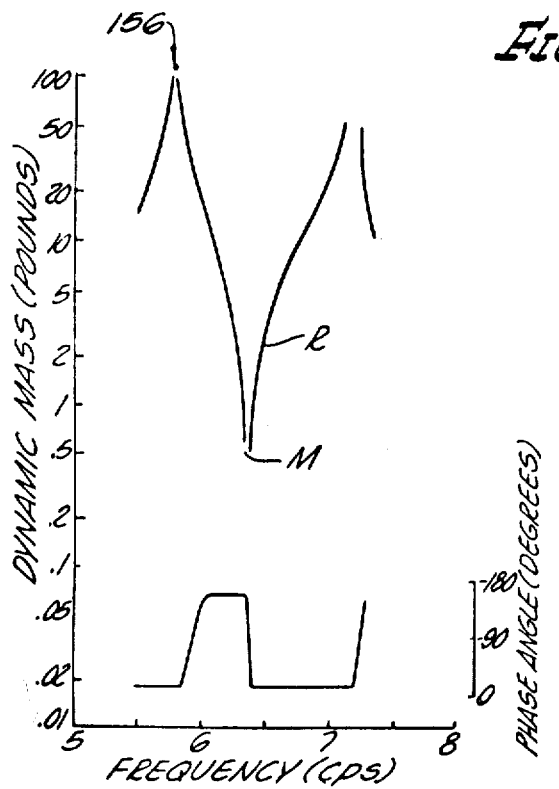

The graph shown in FIG. 3 represents the change in dynamic mass of a line at a given point on the line as a function of the frequency of vibration in the line. The line used for this test was a 155 foot span of 1-inch diameter Drake conductor. For the frequency range shown in this graph, the loop length was approximately 31 feet. The point at which measurements were made was 17 feet from a clamped end of the line. The point M on the graph is the point at which the dynamic mass reaches a minimum and corresponds to the point at which the line resonates. The resonant frequency is about 6.3 cps and the dynamic mass of the line at the point of measurement for this frequency is about 0.5 pound. It can be seen that as the frequency of vibration varies slightly from the resonant frequency, the dynamic mass of the line at the point of measurement increases sharply. The fact that the dynamic mass increases sharply as the frequency is varied slightly from the resonant frequency indicates that the acceleration of the line, and also its deflection, in a vertical plane is reduced sharply. Since the acceleration in the line is reduced sharply as the frequency departs slightly from the resonant frequency, damping is not necessary at such non-resonant conditions. This graphic representation R is indicative of the manner in which the dynamic mass of a line at a point varies when the frequency of vibration is changed slightly from the resonant frequency. The graph S also shows how the phase difference between driving force and acceleration varies with the frequency. In effect, while the wind is blowing, large damping is required at many discrete (resonant) frequencies, and these frequencies vary as the wind speed.

Figure 4:
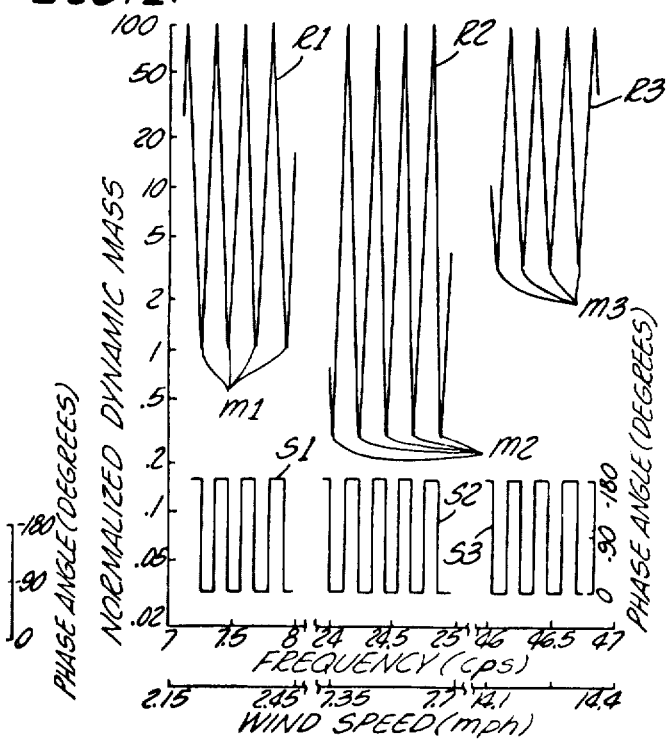

This phenomenon is further borne out by typical graphs R1, R2, and R3 shown in FIG. 4. These graphs apply for a 1-inch transmission line with a 1,000 foot span under 6,000 pounds tension and weighing one pound per foot. The curves are plotted to represent the dYnamic mass at a point 4.5 feet from a clamped end. Graphs S1, S2, and S3 show how the phase difference between driving force and acceleration varies with the frequency.

In the 7 to 8 cps range, the loop length is about 30 feet. As shown in the graph, at least four resonances occur between 7 and 8 cps. These are indicated by the minimum values of dynamic mass. At each resonant point, the dynamic mass of the line is about 1 unit as indicated by the points $m1$. The ordinate scale is provided with normalized units to illustrate relative values of dynamic mass. As the frequency of vibration varies slightly from any one of these four resonant frequencies, the dynamic mass of the line increases sharply. As was pointed out above, for frequencies which are slightly different than the resonant frequencies, damping is unnecessary.

In the frequency range of about 24 to 25 cps it is observed that five resonances occur. The dynamic mass of the line at the point of measurement for each of these resonances is about 0.3 units as indicated by the points $m2$. The loop length in this frequency range is about 9 feet. The dynamic mass of the line at the point of measurement is smaller in this frequency range since the point of measurement (4.5 feet from clamped end) is at the center of the loop length in the frequency range of 24 to 25 cps, whereas in the frequency range of 7 to 8 cps the point of measurement is less than 25 percent of the loop length away from a node point. In the 46 to 47 cps range, the loop length was about 4.8 feet, and the dynamic mass of the line at each resonance is between 3 and 4 units as indicated by the point $m$ 3. The dynamic mass at the resonances in this frequency range is much higher at the point of measurement than in the 24 to 25 cps range because the point of measurement (4.5 feet) is near the node point (4.8 feet). A damper applied at the point of measurement (4.5 feet) would accordingly be more effective for damping vibrations in the 24 to 25 cps range than for damping vibrations in the 46 to 47 cps range.

Since dynamic mass of cables and other structures often varies with frequency in a very complicated manner, it is desirable to be able to determine, by tests, the dynamic mass and the resonant frequencies of various structures, such as cables, panels, and the like. Where the structure is a cable, such information is valuable, for example, both in determining the internal damping characteristics of the cable and in designing dampers for use with the cable, as will be explained more fully hereinafter.

Mechanical impedance or dynamic mass testing devices, such as are described in detail in Shoor et al. U.S. Pat. Nos. 3,210,993 and 3,222,919, which U.S. patents are hereby incorporated herein by reference, have been used to determine the dynamic mass of structures having large dimensions. The later patent describes a device for testing and measuring the mechanical impedance or the dynamic mass of a structure at a point. This testing device consists generally of a vibrator or shaker, an impedance head, and a removable coupler. The combined output of three force transducing units in the impedance head is applied to the input of an amplifier A1. Likewise, the combined output of three accelerometers in the impedance head is applied to the input of an amplifier A2. Accordingly, a meter M1 at the output of an amplifier A1 indicates the sum or average of the signals generated by the three force transducing units while a meter M2 at the output of the amplifier A2 indicates the sum or average of the signals generated by the three accelerometers. A phase detector P, connected to amplifiers A1 and A2, coacts with meter M3 at the output of the phase detector P to indicate the phase lag of the acceleration behind the applied force. When the above described dynamic mass testing device is secured to a test beam at a point and actuated by an oscillator and power source, the beam will be vibrated at predetermined frequencies and the mechanical impedance or the dynamic mass of the test beam at that point may be calculated by employing the data displayed on meters M1, M2 and M3.

Dynamic mass testing devices of the type described above have formerly been employed to determine vibration characteristics of structures having relatively large dimensions, such as metal beams and the like. Where the structure is a cable, tests have formerly been made by securing the testing device at only one point on the cable because the advantages of making measurements at more than one point on the cable are not generally known. I have found, however, that single point testing may result in a partial lack of understanding of the vibration characteristics of the structure. For example, where a cable is the structure to be tested (test structure), there will be different dynamic mass values for different points on the cable at the same vibration frequency. Such testing of a cable at only one point will not yield sufficient information with which to design the most efficient damper for that cable. I have discovered, however, that a more accurate analysis of the vibration characteristics of structures may be obtained by successively securing a dynamic mass testing device to a plurality of selected points on the structure and making measurements at those points in accordance with the methods disclosed herein. By testing the structure at more than one point, as will be described hereafter, sufficient information will be obtained to enable a person to correct vibration conditions in the structure in the most efficient manner. For example, where the test structure is a cable, a person with the additional test information provided by the method of this invention will be able to determine what type of vibration damper to apply at certain points on the cable, as will be explained more fully hereafter.

It is also desirable to be able to obtain the same sort of facility and accuracy in measuring mechanical impedance, dynamic mass, and other vibration characteristics of structures having relatively small dimensions as has been achieved for structures having large dimensions. However, the above described testing device is not directly adaptable for use in testing structures having small dimensions since, without certain modifications, inaccurate results will be obtained.

Therefore, I have invented a method for testing structures, and particularly for testing structures having small dimensions, such as small diameter cables, thin panels, and the like, utilizing dynamic mass testing devices, different in some important respects from the general type described above, to make tests at a plurality of points on the structure. This method may be used for measuring driving-point dynamic mass, transfer dynamic mass, and other vibration characteristics, but will be illustrated herein only in conjunction with the measurement of driving-point dynamic mass.

As used herein, when a structure is said to be small, it is meant to include structures for which the dynamic mass test results obtained by the use of conventional testing methods are inaccurate at resonant frequencies without mathematical correction for the dynamic mass of the measuring portion of the testing device employed. For example, if the small structure is a cable, the cable would have a diameter of 0.721 inches or less. The measuring portion (measuring device) of the testing device, is defined as those parts of the testing device, including any portion of the force measuring device, to which the vibration force is applied above the point in the testing device at which the force measurement is taken. The testing device includes a vibrator and all other apparatus attached at any point on the test structure.

I have found that as the size of the structure to be tested decreases, the dynamic mass of the type of measuring device commonly employed becomes increasingly critical until eventually the dynamic mass of the measuring device which is secured to the test structure in relation to the dynamic mass of the test structure is such that the test results obtained are not useful without substantial mathematical correction to take into account the dynamic mass of the measuring device. More specifically, I have found that the dynamic mass of the measuring device secured to the structure, whether used for measuring driving-point dynamic mass or transfer dynamic mass, should be less than about 10 times the value of dynamic mass of the point at least dynamic mass on the test structure at resonance in order to achieve test results which will be useful without the necessity for mathematical correction.

Also, the static mass or dead weight of the entire testing device connected to the test structure should be equal to or less than the static mass of the test structure in the local region where the testing device is attached. A local region is defined as the volume of the test structure between the node point closest to the point where the testing device is attached when the structure is vibrated at the highest resonant frequency at which measurements are to be made. One of the node points may be at a dead end where the structure is mounted. For example, where a cable is the test structure, the static mass of the testing device should be equal to or less than the static mass of the cable between the node points closest to the point where the testing device is affixed to the cable when the cable is vibrated at the highest resonant frequency at which measurements are to be made. More specifically, where the test structure is a 0.316 inch diameter Sparrow cable with the highest resonant frequency of interest at 182 cycles per second, the weight of the testing device attached to the cable should be less than or equal to the weight of 1 ½ feet of the test cable, or 0.14 pounds.

Furthermore, the vibration testing device should be constructed such that the phase angle of the vibration force applied to the testing device relative to the acceleration of the testing device is about zero as viewed by the structure at the point where the testing device is attached at all frequencies of interest. This implies that the testing device connected to the test structure will act as a rigid mass at all frequencies. That is, the magnitude of the dynamic mass of the testing device attached to the structure should be about the same as the magnitude of the static mass of the testing device over the range of vibration frequencies concerned. If the testing device does not act as a rigid mass and if the above-mentioned phase angle is not about zero, the dynamic mass of the measuring device may influence the dynamic mass readings for the vibrated test structure in such a way as to provide inaccurate test results.

The dynamic mass, static mass, and phase angle requirements stated above apply to structures having large and small dimensions. Failure to meet any one of these requirements could result in inaccurate vibration test results. In structures having large dimensions, inaccurate results are commonly incurred because of the failure to meet these requirements. This results in either motion of the structure in a direction other than the desired direction of vibration or in the introduction of another point of suspension or false dead end in the structure or both. Other adverse conditions could also occur, any one of which could affect the test data in a manner which would make mathematical correction of the data either difficult or impossible. For structures having small dimensions, the above stated requirements become increasingly difficult to meet. For example, I have found that in order to accurately measure the dynamic mass of a small cable having a diameter of 0.721 inches, it is necessary to employ a rigid testing device having a static mass of 0.5 pounds or less. Such a testing device, if it meets the other criteria set forth above and is employed in the steps of my testing method, will provide accurate dynamic mass measurements for this small cable.

In the method of this invention, an appropriate testing device having the characteristics described above is rigidly secured to a test structure, having either large or small dimensions, at some point spaced from both the node points of the structure and dead end points where the structure is mounted. The structure is then vibrated at a predetermined frequency and the amplitude of the force which is applied to the structure, the amplitude of the resulting acceleration of the structure, and the relative phase angle between the force and acceleration are measured. The test structure may be altered or the test conditions may be varied and the predetermined vibration again applied to the structure, thus yielding data regarding vibration characteristicS present for the same application. The frequency of vibration of the structure may be varied in order to determine the various resonant frequencies of the structure within the desired frequency range. The testing device is then moved to another point on the test structure and the operation is repeated. This may be repeated as many times as is desirable in order to obtain a full and accurate analysis of the vibration characteristics of the test structure involved. For example, the dynamic mass of different parts of the structure may be obtained.

Acceleration of the structure may be measured either at the point where the force is applied to the structure or at some other point on the structure, thus giving measurements of either driving-point or transfer dynamic mass.

Figure 5:
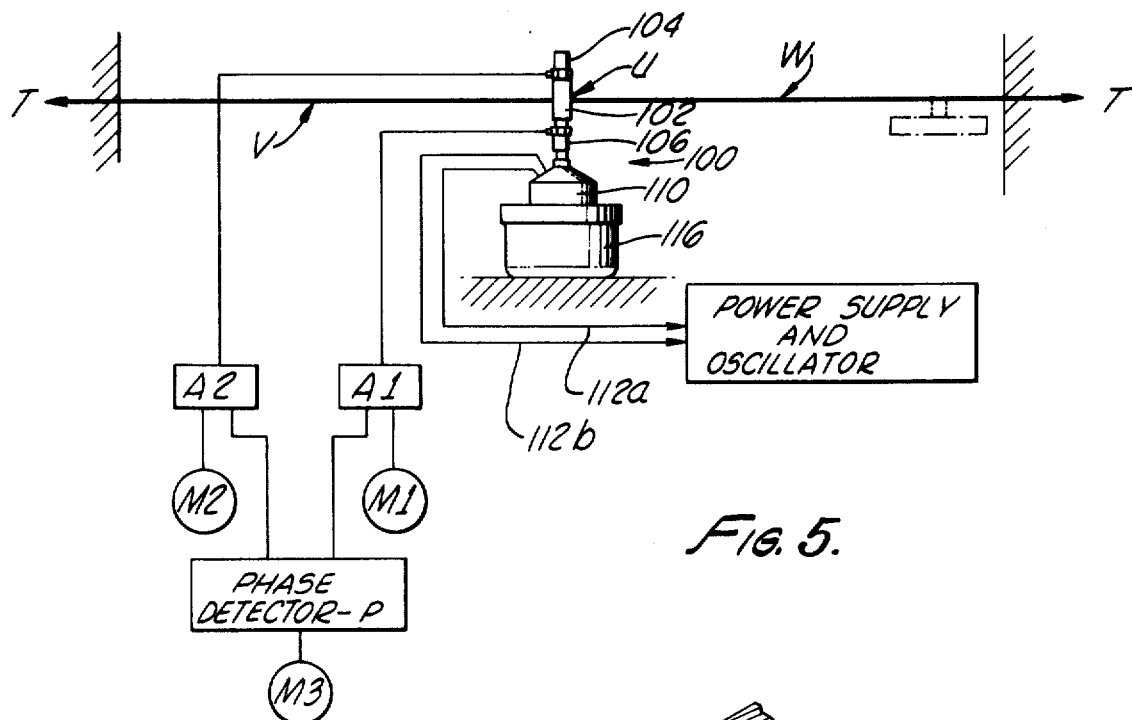
FIG. 5 is a partial plan view and schematic representation of an apparatus for use in the method of this invention.
Figure 6:
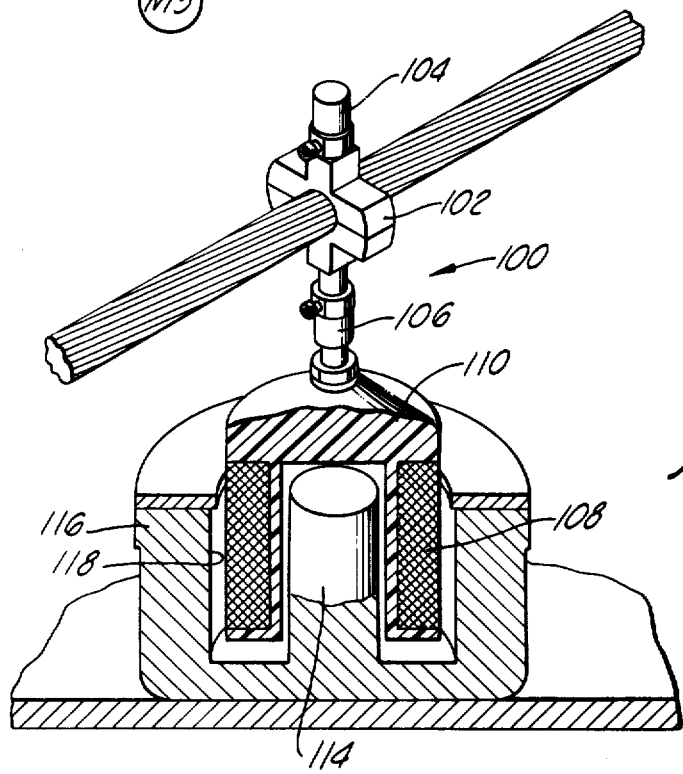
FIG. 6 is a partial sectional plan view of an apparatus suitable for use in the method of this invention.

One type of dynamic mass testing device which may be employed in the method of this invention is shown in FIGS. 5 and 6. In FIG. 5, a cable is stretched between two supports under a tension load T. The dynamic mass testing device 100 is affixed to the cable at some point U. The testing device 100 comprises a measuring device which comprises a clamp 102 rigidly secured to the cable, an accelerometer 104 rigidly mounted on the top of the clamp 102, and a force transducer 106 rigidly mounted on the bottom of the clamp. These three components comprise the measuring device of this testing device since the force measurement is taken at the bottom of the force transducer 106. Below the lower end of the force transducer 106, a circular coil 108 is wound in the horizontal plane on the exterior of a hollow cylindrical support member, or bobbin, 110 which is rigidly secured to the force transducer 106. The support 110 and coil 108 comprise a vibrator and are part of the testing device connected to the test structure. The support 110 is constructed of non-magnetic material, such as plastic or the like. Electrical leads 112a and 112b are affixed to the coil such that when alternating current is applied to the leads, current flows through the coil 108 producing an alternating magnetic field which alternates clockwise and counter-clockwise around the coil 108. The coil 108 and support member 110 are adapted to vibrate freely in the vertical direction within the cylindrical space 118 provided between two oppositely polarized concentric cylindrical pole pieces 114 and 116 of an independently mounted permanent magnet. One cylindrical pole piece 114 is positioned inside the cylindrical space formed by the coil 108 and support member 110. The other pole piece 116 is positioned around the outside of the coil 108. Neither the coil 108 nor the support member 110 are in mechanical contact with the permanent magnet pole pieces 114 and 116 and therefore the pole pieces 114 and 116 are not part of the testing device connected to the test structure or cable.

Thus, when alternating current is applied to the coil 108 through leads 112a and 112b, the interaction of the alternating magnetic field generated around the windings of the coil 108 with the magnetic field between the permanent magnet pole pieces 114 and 116 will cause the coil 108 to oscillate in the vertical direction in a manner well known to those skilled in the art. Since the coil 108 is rigidly secured to the cable, the cable will vibrate in synchronism with the vibration of the coil 108.

Alternating current is supplied through leads 112a and 112b to the coil 108 by means of a power supply and oscillator. The outputs of the force transducer 106 and the accelerometer 104 are applied to amplifiers A1 and A2 respectively, and both outputs to phase detector P as has been previously described, and the results displayed on meters M1, M2 and M3. Alternatively, the output of the accelerometer 104 and the force transducer 106 may be applied to either a dual trace or a dual beam oscilloscope (not shown). This allows direct measurement of the amplitude of the signals representing the acceleration motion of the cable and the force applied to the cable to be made from oscillograms. Also, the phase angle between the two signals may be read directly from such oscillograms.

For some structures, it is desirable to vary the frequency of vibration of the testing device 100 over a wide range in order to measure the vibration characteristics at all possible resonant frequencies and at other frequencies of the structure within that frequency range. This is easily accomplished by varying the current applied to the coil 108 to produce different vibration frequencies. Data may be continuously or periodically recorded as the frequency of vibration applied to the test structure is varied.

In order to obtain a complete analysis of the vibration characteristics of some structures, it is necessary to secure the testing device 100 successively at various points on the test structure. As the testing device 100 is moved from point to point on the structure, the full range of the vibration frequencies of interest may be imposed on the structure at each point. For example, it might be desirable to secure the testing device 100 successively to points U, V and W on the cable as shown in FIG. 5.

Transfer dynamic mass may also be readily measured by this method by securing the accelerometer 104 at a point on the test structure spaced from the point where the force transducer 106 and the coil 108 are secured to the structure.

The above described testing method of this invention may be used to determine various vibration characteristics of many types of structures. This testing method has particular application in the design of dampers for cables. For example, it is desirable to design cable dampers for the resOnant frequencies of the cables. A resonant frequency of a cable occurs when the value of minimum dynamic mass of the cable at a point other than a node point on the cable is reached. By testing, it may be determined where the node points occur at resonant frequencies since a test during vibration at a node point will show zero acceleration of the cable at that point. By determining the dynamic mass of the test cable at a point halfway between two node points at resonant frequencies, the dynamic mass of the cable for which the damper should be designed is determined. A determination of such points of minimum dynamic mass of a cable at resonance usually requires that the testing device be secured successively to the cable at more than one point. As will be explained hereafter, it has been found that the dynamic mass of the damper should be about ten times greater than the dynamic mass of the cable at the points of minimum dynamic mass at resonant frequencies.

In order to be most effective, the dynamic mass of a damper must be large compared to the dynamic mass of the line. For this reason, to be most efficient the damper should be located away from node points in the line.

It has been determined experimentally that while effective damping may be obtained by a damper located at least 10 percent of the loop length away from a node point, more effective damping results if the damper is at least 25 percent of the loop length away from a node point. The node points corresponding to different frequencies are located at different distances along the span of the cable, except at the very ends. The driving frequency varies with wind speed as indicated on the lower scale of FIG. 4. In other words, the frequency at which vibration of the line is being forced varies as the speed of the wind changes. It is desirable to damp vibrations particularly at the resonant frequencies. As the wind speed increases, the first node point moves closer and closer to the end of the cable span. Therefore, a damper D having a high effective dynamic mass compared with the dynamic mass of the cable is located near one of the ends of the cable as indicated in FIG. 5 in order that it may be spaced from all possible nodes corresponding to wind speeds up to a high value likely to be encountered in the area where the cable is installed. Such a damper may be of the type described and claimed in my parent application Serial No. 629,532, now Patent No. 3,446,907.

Figure 7:
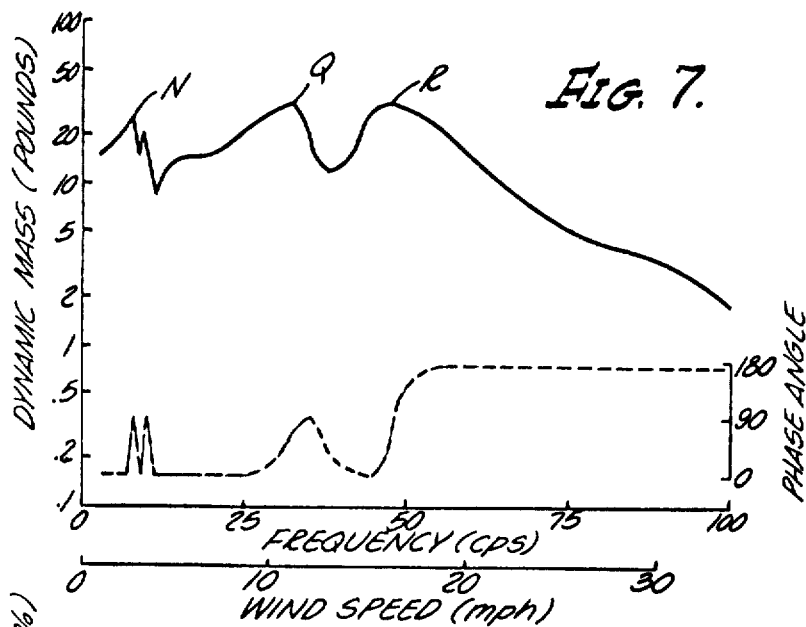
FIG. 7 is a graph demonstrating certain characteristics of a damper.

The graph of FIG. 7 shows how the dynamic mass of one such damper varies as a function of the frequency of vibration. Maximum dynamic mass of the damper occurs at the damper resonance points N, Q, and R.

The extent to which a damper reduces vibrations in a line depends upon the ratio of the dynamic mass of the damper to the dynamic mass of the line at the point at which the damper is applied. If several dampers are attached along the line and their dynamic mass is ten times as great as the dynamic mass of the line, the amplitude of vibration at that particular frequency will be reduced to about 10 percent of what it would be if the dampers were not applied.

Figure 8:
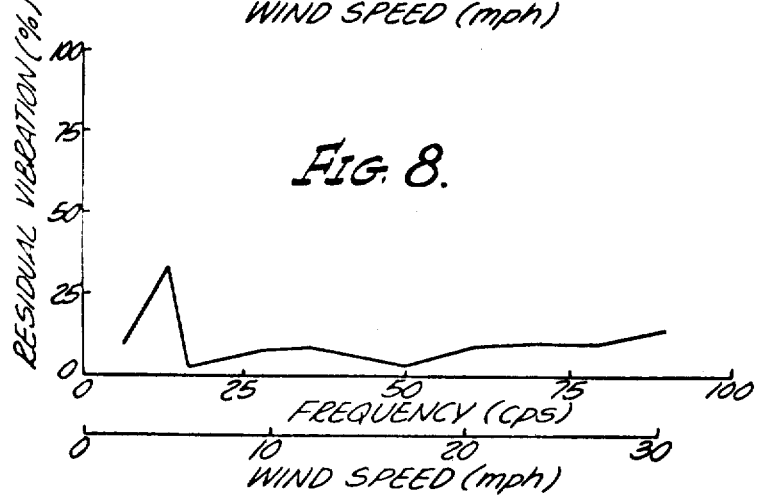
FIG. 8 is a graph which demonstrates the effectiveness of one damper on a cable tested with the method of this invention.

In FIG. 7 it is seen that the dynamic mass of one damper is greater than 8 pounds up to a frequency of about 70 cps. Such a damper would be effective in reducing vibrations at resonances for which the dynamic mass of the line is less than about 1 pound at the point at which the damper is applied. Thus, the vibration of the Drake line described with reference to FIG. 4 would be reduced in amplitude by at least about 80 to 90 percent at all wind speeds between about 5 mph and about 30 mph and more as indicated by the residual vibration measurements in FIG. 8, which were obtained with two dampers installed on one end of a 155-foot span.

From the foregoing explanation it may readily be seen that the method of this invention provides a simple, effective, and accurate method for designing multi-mode vibration dampers which are effective for damping critical vibrations of cables over a wide range of wind speeds. It will be apparent from the foregoing description that the invention is not limited to the testing of cables for the purpose of designing dampers and cables, but that many structures may be tested by the method of this invention for various purposes. Also, many different testing devices may be used in the method of this invention and the method may be employed to determine various vibration characteristics of structures, all without departing from the scope of the invention as defined in the accompanying claims.

The invention claimed is:

1. A method of determining the vibration characteristics of a suspended cable, comprising:

Attaching a testing device to the cable intermediate the points of suspension;

energizing the testing device to apply an alternating mechanical force to the cable at a predetermined frequency corresponding to a wind speed of about 2 miles per hour, the phase angle of the force applied to the testing device relative to the resulting acceleration of the testing device being about zero as viewed from the point of attachment to the cable;

measuring the ratio of said force to the resulting acceleration at said frequency; and attaching the testing device at a second point on the cable and repeating the foregoing steps.

2. A method as defined in claim 1 comprising the steps of repeating such measurements at a number of frequencies over a band including frequencies at which said cable is vibrated by the wind at wind speeds greater than about 2 miles per hour.

3. A method of determining the vibration characteristics of a suspended cable, comprising:

attaching a measuring device to the cable intermediate the points of suspension and spaced from node points corresponding to a predetermined resonant frequency of the suspended cable, and from the dead ends of the cable, the dynamic mass of the measuring device as viewed from the cable being less than about 10 times greater than the dynamic mass of the cable at the point of attachment as viewed from the measuring device at said resonant frequencies of the cable;

attaching vibrating means to the measuring device;

forcing the vibrating means to vibrate the cable at a predetermined frequency near said resonant frequency, the phase angle of the force applied to the measuring device and vibrating means relative to the resulting acceleration of the measuring device and vibrating means being about zero as viewed from the point of attachment to the cable;

measuring the ratio of said force to the resulting acceleration at said predetermined frequency; and repeating the foregoing steps at a second intermediate point, whereby the manner in which the said ratio varies from one point to another may be determined.

4. A method of determining the values of driving-point dynamic mass of a small suspended cable at various points along the cable at various vibration frequencies, comprising:

rigidly mounting a motion transducer and a force transducer at a point on the small cable intermediate the points of suspension and spaced from node points and from dead ends of the cable, the dynamic mass of the transducers as viewed from the cable being less than about ten times greater than the dynamic mass of the cable at the point of attachment as viewed from the transducers at predetermined resonant frequencies of the cable corresponding to low wind speeds including, a speed of about 2 miles per hour;

attaching a vibrator to the force transducer, the sum of the static masses of the two transducers and the vibrator being equal to or less than the static mass of the cable within the local region over a range of frequencies including said resonant frequencies;

forcing the vibrator to vibrate the cable at a predetermined frequency;

measuring the resultant force which the vibrator applies to the cable at said predetermined frequency;

measuring the acceleration of the resultant vibration of the cable at said predetermined frequency, whereby the ratio of the force at said point to the acceleration at said point may be determined at said predetermined frequency;

measuring the relative phase angle of the force and acceleration at said predetermined frequency;

varying the predetermined frequency of vibration over said range and repeating the foregoing measuring steps; and rigidly mounting the motion transducer and the force transducer and vibrator at a second point on the cable spaced from the node points and dead ends of the cable, and repeating the foregoing steps, whereby the manner in which said ratio and said relative phase angle varY as a function of frequency from one point to another may be determined.

5. A method as described in claim 4 wherein, the sum of the static masses of the motion transducer, force transducer, and vibrator is less than about one-half pound within said range of frequencies.

6. A method as described in claim 4 wherein, the phase angle of the force applied to the transducers and the vibrator relative to the resulting acceleration of the transducers and the vibrator is maintained at about zero as viewed from the point of attachment to the cable at said predetermined frequencies.

7. A method as described in claim 4, further comprising the step of changing the tension force in the cable after measurements are made at a series of vibration frequencies.

8. A method as described in claim 4 comprising:

utilizing for said vibrator a device comprising a relatively movable magnetic and coil members;

supporting one of such members on the ground; and attaching the other member to the force transducer whereby the dynamic mass of the ground-supported member does not substantially affect the dynamic mass of the vibrator as seen from the cable.

9. A method of determining the value of transfer dynamic mass of a small suspended cable at various points along the cable, comprising:

rigidly mounting a motion transducer at a first point on the small cable intermediate the points of suspension and spaced from node points corresponding to predetermined resonant frequencies of the cable;

rigidly mounting a force transducer at a second point on the cable intermediate the points of suspension and away from such node points, the dynamic mass of both the motion and force transducers as viewed from the cable being less than about 10 times greater than the dynamic mass of the cable at the respective points of attachment as viewed from the respective transducers at predetermined resonant frequencies of the cable;

attaching a vibrator to the force transducer, the static mass of the motion transducer and the sum of the static masses of the force transducer and the vibrator being equal to or less than the static mass of the cable within the respective local regions;

forcing the vibrator to vibrate the cable at a predetermined frequency, the phase angle of the force applied to the force transducer and vibrator relative to the resulting acceleration of the force transducer and the vibrator being about zero as viewed from the point of attachment to the cable at said predetermined frequency;

measuring the force that the vibrator applies to the cable at the second point while being so forced;

measuring the acceleration of the resultant vibration of the cable at the first point; and measuring the relative phase angle of the force and acceleration.

10. A method of determining the value of transfer dynamic mass of a suspended cable at various points along the cable, comprising:

rigidly mounting a motion transducer at a first point on the cable intermediate the points of suspension and spaced from node points corresponding to predetermined resonant frequencies;

rigidly mounting a force transducer at a second point on the cable intermediate the points of suspension and away from node points and dead ends of the cable; the dynamic mass of both the motion and force transducers as viewed from the cable being less than about 10 times greater than the dynamic mass of the cable at the respective points of attachment as viewed from the respective transducers at predetermined resonant frequencies of the cable;

attaching a vibrator to the force transducer, the static mass of the motion transducer and the sum of the static masses of the force transducer and the vibrator being equal to or less than the static mass of the cable within the respective local regions;

forcing the vibrator to vibrate the cable at a predetermined frequency, the phase angle of the force applied to the force transducer and vibrator relative to the resulting acceleration of the force transducer and the vibrator being about zero as viewed from the point of attachment to the cable at said predetermined frequency;

measuring the force that the vibrator applies to the cable at the second point; and measuring the acceleration of the resultant vibration of the cable at the first point, whereby the ratio of the force at said second point to the acceleration at said first point may be determined at said predetermined frequency.

11. A system for measuring the mechanical impedance of the cable comprising:

means for suspending the cable between two ground points;

vibration detecting means including an accelerometer;

clamping means for attaching said accelerometer to the cable between the ends thereof;

vibration generating means comprising a pair of members that are coupled together magnetically;

means for connecting one of said members to the cable to vibrate the same and for connecting the other member to a ground point but not otherwise to the cable or to said one member;

means for applying an alternating electrical signal of predetermined frequency to one of said members to develop an alternating magnetic force between them thereby causing said members to move relative to each other under the influence of such alternating magnetic forces, whereby said cable is vibrated; and means connected to said accelerometer for measuring the resultant acceleration of the cable.

12. A system as defined in claim 11 including a force transducer for detecting the force applied to the cable.

13. A system as defined in claim 12 including means connected to said force transducer and said accelerometer for measuring the phase difference between the force applied to the cable and the resultant acceleration of a point of the cable.

* * * * *